United States Patent [19]

Rubenthaler

[11] 4,295,691
[45] Oct. 20, 1981

[54] MOUNTING GROMMET

[75] Inventor: Randall J. Rubenthaler, Lincoln, Nebr.

[73] Assignee: Caterpillar Tractor Co., Peoria, Ill.

[21] Appl. No.: 878,009

[22] Filed: Feb. 15, 1978

Related U.S. Application Data

[63] Continuation of Ser. No. 742,145, Nov. 15, 1976, abandoned.

[51] Int. Cl.³ .............................................. F16C 27/00
[52] U.S. Cl. ......................................... 308/238; 16/2; 174/152 G
[58] Field of Search .................... 308/26, 238, 237 R, 308/237 A; 16/2, DIG. 33; 85/70; 174/152 G, 153 G; 248/9, 358 R; 267/63 R, 153; 403/224

[56] References Cited
U.S. PATENT DOCUMENTS

| | | | |
|---|---|---|---|
| 2,828,095 | 3/1958 | Beck et al. | 85/70 |
| 3,304,043 | 2/1967 | Beck | 248/358 R |
| 3,424,503 | 1/1969 | Schulz | 308/238 |
| 3,756,551 | 9/1973 | Bishop | 248/9 |

Primary Examiner—Charles E. Frankfort
Attorney, Agent, or Firm—Wegner, Stellman, McCord, Wiles & Wood

[57] ABSTRACT

A mounting grommet intended for use in bores having sharp corners. The grommet includes a sleeve of hard material and a tubular, elastomeric element extending about and along the length of the sleeve. The element includes a cylindrical shank terminating at one end in an enlarged head. An axially extending recess is disposed in the head at its interface with the shank and the head has a generally frusto-conical surface on its side opposite the recess, the radially outer portion of the frusto-conical surface being located intermediate the ends of the elastomeric element. When applied to a bore in a rigid element having sharp corners, and compressed, the construction causes the recess to deflect radially inwardly at the corner so that there is no contact between the elastomeric element and the corner that would cause premature failure of the grommet.

2 Claims, 2 Drawing Figures

U.S. Patent  Oct. 20, 1981  4,295,691
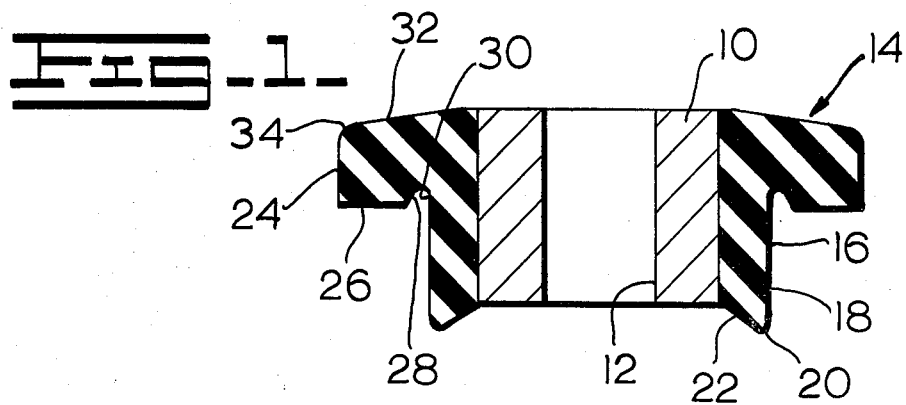
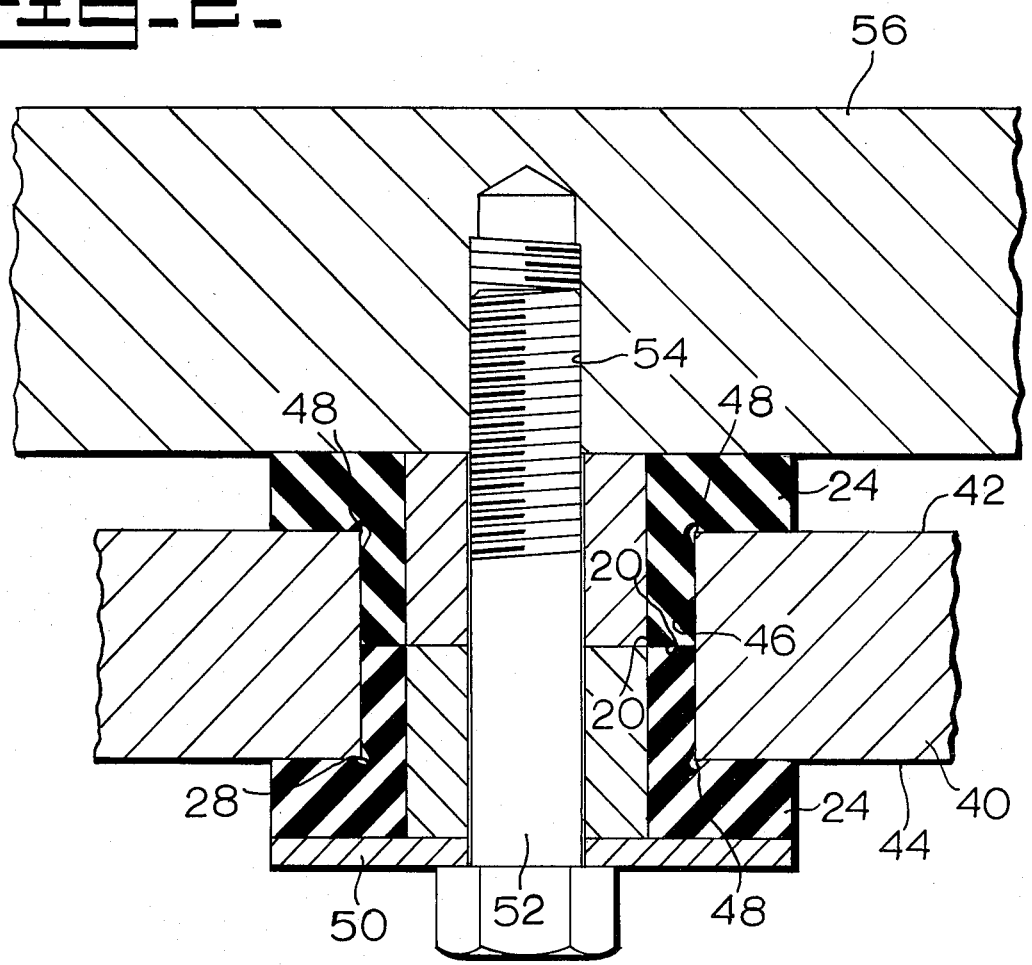

MOUNTING GROMMET

This is a continuation, of application Ser. No. 742,145 filed Nov. 15, 1976, now abandoned.

BACKGROUND OF THE INVENTION

This invention relates to mounting grommets.

Prior art of possible relevance includes the following U.S. Pat. Nos. 2,828,095 issued Mar. 25, 1958 to Beck et al; and 3,424,503 issued Jan. 28, 1969 to Schulz.

Resilient mounting grommets are frequently employed in the securing of two elements together such that vibration transmission between the elements is minimized or eliminated. In the usual case, the grommet is received in a bore in one of the elements to be secured together and has a resilient surface confronting one of such elements. Typically, the grommet will have a cylindrical shank and an enlarged head which are formed of an elastomeric material, as mentioned, and when the bore in the element, at its point of emergence has not been suitably deburred or countersunk, it will have a sharp corner. During use of any apparatus incorporating such elements, vibrations will occur, with the result that the sharp corner will cut into the elastomeric material of which the grommet is in part formed and will cause premature failure.

SUMMARY OF THE INVENTION

It is the principal object of the invention to provide a new and improved mounting grommet. More specifically, it is an object of the invention to provide such a mounting grommet wherein, when the same is installed in the bore of an element having sharp corners, there will be no contact between a sharp corner of the bore and the mounting grommet that would cut into the elastomeric material of which the grommet is formed to cause such failure.

An exemplary embodiment of the invention achieves the foregoing objects in a construction including a sleeve of hard material and a tubular elastomeric element extending about and along the length of the sleeve. The element includes a cylindrical shank having an enlarged head at one end. An axially extending recess is located in the head at its interface with the shank. The head has a generally frusto-conical surface on its side opposite the recess, the radially outer portion of which is located intermediate the ends of the elastomeric element. As a consequence of the foregoing construction, when the head of the grommet is pressed during installation of the same, the recess will be deformed radially inwardly at the interface and out of contact with any sharp corner of the bore in which the grommet is installed.

Preferably, according to the preferred embodiment of the invention, the radially inner extremity of the recess is at least equal to the diameter of the shank so that the grommet may be formed without the necessity of complicated molding procedures.

In a highly preferred embodiment, the end of the elastomeric element opposite from the head includes an annular projection having its radially outer surface extending beyond the corresponding end of the sleeve. Generally, the radially inner surface of the annular projection will also be frusto-conical.

In a preferred embodiment, the recess formed in the head is arcuate in cross section and the invention contemplates a mounting including a generally rigid element having opposed sides and a bore extending therethrough. A pair of grommets made according to the invention are disposed in the bore in opposed relation with their projections in abutment with each other and their heads in contact with respective ones of the opposed sides. Clamping means extend through the sleeves and axially compress the heads on the rigid element to deform the recesses radially inwardly as mentioned previously.

Other objects and advantages will become apparent from the following specification taken in connection with the accompanying drawings.

DESCRIPTION OF THE DRAWINGS

FIG. 1 is a sectional view of a grommet made according to the invention; and

FIG. 2 is a sectional view of a mounting employing grommets made according to the invention.

DESCRIPTION OF THE PREFERRED EMBODIMENT

A grommet made according to the invention is illustrated in FIG. 1 and is seen to include a cylindrical sleeve 10 having a bore 12 formed of hard material, usually metal. A tubular, elastomeric element 14 extends about and along the length of the sleeve. The elastomeric element includes a cylindrical shank 16 which terminates at an end 18 with an annular projection 20. The annular projection has its radially outer surface extending beyond the corresponding end of the sleeve, as can be ascertained from FIG. 1, and its radially inner surface 22 is generally frusto-conical.

The opposite end of the elastomeric element 14 terminates in an enlarged head 24. The side 26 of the head 24 faces the shank 16 and includes an annular, axially directed recess 28 which is arcuate in cross section. It will be observed that the radially inner extremity 30 of the recess 28 is of the same diameter as the shank 16. Those skilled in the art will recognize that such a configuration allows the elastomeric element 14 to be readily molded, a factor of great importance economically.

The side 32 of the head 24 opposite from the side 26 is frusto-conical and its radially outer extremity 34 is located so as to be intermediate the ends of the elastomeric element 14. That is, the radially outer extremity 34 of the frusto-conical surface 32 is located between planes encompassing opposite ends of the elastomeric element 14 and transverse to the axis of the bore 12 in the sleeve 10.

FIG. 2 illustrates a mounting including two of the grommets illustrated in FIG. 1 in an assembled condition. A plate 40 has opposite sides 42 and 44 and a bore 46 extending therethrough. As can be seen, sharp corners 48 are located at the points of emergence of the bore 46 from the plate 40. Two of the grommets are located within the bore 46 in opposing relation such that the projections 20 are in abutment with each other. At the same time, the enlarged heads 24 are in contact with corresponding ones of the sides 42 and 44 of the plate 40.

A washer 50 is applied to the frusto-conical surface 32 of one of the grommets and a bolt 52 extends through the aligned bores 12 in both grommets to be received in a tapped bore 54 in an element such as a plate 56 to be secured by the grommets to the plate 40.

As the bolt 52 is tightened, the elastomeric elements 14 of the grommets will deform due to the projections 20 on their ends where they abut and the material will tend to flow radially outwardly so that the sides of the shank 16 tightly embrace the sides of the bore 46. At the same time, pressure will be initially applied to the radially inner parts of the frusto-conical surface 32 on the head 24 until a planar configuration, as illustrated in FIG. 2, is assumed. The deformation of the heads 24 will cause the recesses 28 to deform radially inwardly as illustrated in FIG. 2. As a result, the sharp corners 48 of the bore will be located within the recesses and out of contact with the elastomeric element 14. Thus, vibration of either or both of the plates 40 and 56 will not cause the sharp corners 48 to cut into the elastomeric element 14 of either grommet to destroy their usefulness while prevention of vibration transmission will still be accomplished.

It is to be particularly observed that the grommet construction disclosed does not require compound molding techniques as would be the case if the grooves 28 were initially formed in the position illustrated in FIG. 2. The unique inter-relationship of the configuration of the surface 32 and the location of the radially inner extremity 30 of the grooves 28 permits use of simple molding techniques while ensuring that the grommets, when installed, will have elastomeric parts thereof out of contact with sharp edges of the components of the assemblage with which they are used.

What is claimed is:

1. A mounting grommet comprising:

a sleeve of hard material;
 a tubular, elastomeric element extending about and along the length of said sleeve, said element having a length greater than that of said sleeve and including
 a cylindrical shank having an enlarged head at one end, said head having an axial length considerably shorter than that of said element;
 an axially opening and extending annular recess in said head at its interface with said shank, the radially inner wall of said recess being of the same diameter as said shank,
 said head having a generally frusto-conical surface on its side opposite said recess, the radially outer portion of said frusto-conical surface being located intermediate the ends of said elastomeric element; and
 means for axially compressing said element to a length about equal to that of said sleeve;
 whereby said recess will deflect radially inwardly to a location partly in said head and partly in said shank.

2. The mounting grommet of claim 1 wherein said shank terminates at its end remote from said head in an axial projection beyond the corresponding end of the sleeve, said projection having a radially inner, frusto-conical surface.

* * * * *